United States Patent
Bosch (10) Patent No.: US 10,447,418 B2
(45) Date of Patent: *Oct. 15, 2019

(54) METHOD AND APPARATUS FOR CONTROLLING DELAY IN A DEVICE FOR TRANSPORTING PACKETS OVER OPTICAL TRANSPORT NETWORK

(71) Applicant: AimValley B.V., Hilversum (NL)

(72) Inventor: Willem Van Den Bosch, Loenen aan de Vecht (NL)

(73) Assignee: AIMVALLEY B.V., Hilversum (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,582

(22) Filed: Jul. 30, 2018

(65) Prior Publication Data

US 2018/0367232 A1    Dec. 20, 2018

Related U.S. Application Data

(63) Continuation of application No. 15/614,778, filed on Jun. 6, 2017, now Pat. No. 10,038,511.

(51) Int. Cl.
*H04B 10/00* (2013.01)
*H04J 3/06* (2006.01)
(Continued)

(52) U.S. Cl.
CPC ............ *H04J 3/0682* (2013.01); *H04B 10/25* (2013.01); *H04B 10/40* (2013.01); *H04J 3/07* (2013.01);
(Continued)

(58) Field of Classification Search
CPC ...... H04J 3/0667; H04J 3/0682; H04J 3/0685; H04J 3/0688
See application file for complete search history.

(56) References Cited

U.S. PATENT DOCUMENTS 7,684,419 B2    3/2010  Loprieno
8,854,963 B1*  10/2014  Muma ................... H04B 10/27
                                                     370/231
(Continued)

OTHER PUBLICATIONS

"Optical Transport Network", en.wikipedia.org/wiki/Optical_Transport_Network, unkown but published prior to Jun. 6, 2017, pp. 3.
(Continued)

*Primary Examiner* — Daniel G Dobson
(74) *Attorney, Agent, or Firm* — Ichthus International Law PLLC (57) ABSTRACT

A method and apparatus for controlling delay over a data path in a device for transporting Ethernet packets over an optical transport network. The device is configured to receive an incoming clock signal having a first frequency and an incoming data signal and to output an outgoing clock signal having a second frequency and an outgoing data signal. One or more delays over the data path in the device are measured in a predetermined measurement period. A phase adjustment amount is determined based on the one or more measured delays over the data path in the predetermined measurement period, and based on the determining phase adjustment amount, a phase of the outgoing clock signal is adjusted by a phase locked loop in such a way that the delay over the data path in the device is substantially equal to a fixed delay value.

19 Claims, 8 Drawing Sheets

(51) Int. Cl.
*H04J 3/16* (2006.01)
*H04B 10/40* (2013.01)
*H04J 3/07* (2006.01)
*H04B 10/25* (2013.01)
*H04J 14/00* (2006.01)
*H04Q 11/00* (2006.01)

(52) U.S. Cl.
CPC .............. *H04J 3/16* (2013.01); *H04J 3/1652* (2013.01); *H04J 3/0638* (2013.01); *H04J 3/0655* (2013.01); *H04J 2203/0085* (2013.01); *H04Q 2011/0088* (2013.01)

(56) References Cited

U.S. PATENT DOCUMENTS

| | | | |
|---|---|---|---|
| 9,312,900 B2 | 4/2016 | Van Den Bosch et al. | |
| 2014/0307728 A1* | 10/2014 | Nakajima | H04J 3/0682 370/350 |

OTHER PUBLICATIONS

"Optical Transport Network (OTN) Tutorial," Timothy P. Walker, ITU tutorial material, unknown but published prior to Jun. 6, 2017, pp. 62.

"Timing characteristics of telecom boundary clocks and telecom time slave clocks," Recommendation ITU-T G.8273.2/Y.1368.2, published in May 2014, pp. 36.

"Interfaces for the optical transport network," Recommendation ITU-T G.709/Y.1331, Section 17 Mapping of client signals, pp. 77-95, published in Jun. 2016, pp. 244.

* cited by examiner

METHOD AND APPARATUS FOR CONTROLLING DELAY IN A DEVICE FOR TRANSPORTING PACKETS OVER OPTICAL TRANSPORT NETWORK

CROSS-REFERENCE TO RELATED APPLICATION(S)

This application is a continuation of a U.S. patent application Ser. No. 15/614,778, filed on Jun. 6, 2017, which is now U.S. patent Ser. No. 10/038,511 issued on Jul. 31, 2018, the entire content of which is incorporated herein by reference in its entirety.

TECHNICAL FIELD

The present disclosure relates to optical communications, and in particular, a method and apparatus for controlling delay in a data path in a device for transporting packets such as Ethernet packets over optical transport network.

BACKGROUND

The widespread use of high speed Ethernet links, e.g., 10GigE links, in data centers and numerous video applications have driven the need for higher speed Ethernet interfaces in the data centers and other core networks. Ever growing user traffic and expansion of enterprise local area network traffic has be a major driver for transporting Ethernet across metropolitan and core optical networks. Using optical transport network (OTN), per ITU-T G.709 standard, which is incorporated herein by reference in its entirety, provides a cost-efficient transport layer that supports various applications and technology including a dense wavelength division multiplexing (DWDM). As such, OTN can serve as a converged transport layer for new packet based services as well as existing time division multiplexing services.

Further, the optical transport network architecture allows transport Ethernet transparently over an optical transport network. This means that synchronization signals such as SyncE may be transported over an optical transport network tunnel, via Ethernet physical layer, however, if a Time of Day (ToD) needs to be transported, it is not possible to do so because the current implementation of the OTN network has large variable delays for packet transport. Further, in the existing implementation of the OTN network, an average delay of a data path is not deterministic and changes for several hundreds of nanoseconds every time a link is re-connected and/or a system is re-powered.

For implementation of ToD protocols such as a network timing protocol (NTP) and IEEE1588 using the existing technology, it is assumed that the delay is constant and equal in both directions. If NTP or IEEE1588 protocols are used via Ethernet packets that are transported through an OTN network, variable delays of the OTN network will degrade the performance of the ToD distribution in such a way that it is required to distribute the ToD via another path. Another option is to use the IEEE1588 transparent clock (TC) function may be implemented using the existing technology, but the implementation of the IEEE1588 TC protocol breaks the SyncE feature. Since it requires to convert the Ethernet line-code to packets, search for IEEE1588 packets, calculate expected delay through a system, add the measured system delay in the IEEE1588 packet, and convert the packets back to the Ethernet line-code, thus breaking the layer 1 synchronization.

As such, there is still a need for further improved and more efficient methods and systems for transporting Ethernet packets over an optical transport network.

SUMMARY

This summary is not intended to identify key features or essential characteristics of the claimed subject matter, nor is it intended to limit the scope of the claimed subject matter. Example embodiments described herein relate to methods and apparatuses for transporting Ethernet packets over an optical transport network.

By way of example, an optical transceiver for optical communications in accordance with an aspect of the present disclosure is provided. A method and apparatus for controlling a delay over a data path in a device for transporting the Ethernet packets over the optical transport network. The device is configured to receive an incoming clock signal having a first frequency and an incoming data signal and to output an outgoing clock signal having a second frequency and an outgoing data signal. One or more delays over the data path in the device are measured in a predetermined measurement period. A phase adjustment amount is determined based on the one or more measured delays over the data path in the predetermined measurement period, and based on the determining phase adjustment amount, a phase of the outgoing clock signal is adjusted by a phase locked loop in such a way that the delay over the data path in the device is substantially equal to a fixed delay value.

In an aspect of the present disclosure, the data path includes an Ethernet client data path.

In an aspect of the present disclosure, the incoming clock signal may have a fixed frequency relation with respect to the outgoing clock signal. Further, adjusting the phase of the outgoing clock signal may include steering the phase locked loop by either decreasing or increasing a phase of the incoming clock signal.

In another aspect of the present disclosure, the fixed delay value may include an average delay over the data path in the device. Also, the fixed delay value may include a delay mid-point value between a minimum measured delay and a maximum measured delay measured over the data path in the device for the predetermined measurement period.

In another aspect of the present disclosure, the first frequency of the incoming clock signal and the second frequency of the outgoing clock signal may be substantially the same.

Further, in an aspect of the present disclosure, the incoming clock signal does not have any fixed frequency relation with respect to the outgoing clock signal, and adjusting a phase of the outgoing clock signal includes steering a phase of the phase locked loop based at least on de-mapping information included in the incoming data signal. By way of example, the de-mapping information includes stuff indication information. The outgoing clock signal may include an outgoing server clock signal.

In another aspect of the present disclosure, when the incoming clock signal does not have any fixed frequency relation with respect to the outgoing server clock signal, the phase of the outgoing client clock signal may be steered based on additional mapping bit stuff information to adjust the phase of the outgoing client signal, and the mapping information may include stuff indication information.

In an aspect of the present disclosure, the incoming data signal may include an optical transport network (OTN) signal and the outgoing data signal may include an Ethernet client signal. The Ethernet client signal may also include one Gigabit Ethernet (1 GbE), ten Gigabit Ethernet (10 GbE), etc.

In another aspect of the present disclosure, steering a phase of the phase locked loop may be based on inserting a number of data bits in the outgoing data signal. The steering of the phase of the client Ethernet signal may be based on an additional number of mapping data bits in the server data signal to control the latency of the Ethernet client data path in the device. Further, the adjusting of the phase of the outgoing clock signal may include adding additional de-mapping information to adjust an output frequency of the phase locked loop in such a way that the delay in the data path in the device is substantially equal to a fixed delay value.

In another aspect of the present disclosure, an example of an apparatus is disclosed for controlling a delay in a data path in a system configured to transport Ethernet packets over an optical transport network. In the example, the system is configured to receive an incoming clock signal having a first frequency and an incoming data signal and to output an outgoing clock signal having a second frequency and an outgoing data signal. The apparatus includes a current delay measurement unit, a delay control unit, and a phase adjustment unit. The current delay measurement unit is configured to measure one or more delays in the data path in the system for a predetermined measurement period. The delay control unit is configured to produce a delay adjustment amount based on the one or more measured delays in the data path in the system. The phase adjustment unit is coupled to a phase locked loop and is configured to receive the delay adjustment amount from the delay control unit and configured to steer the phase locked loop to produce the outgoing clock signal such that the delay in the data path in the system is substantially equal to a fixed delay value.

In an aspect of the present disclosure, in the apparatus, the incoming clock signal may have a fixed frequency relation with respect to the outgoing clock signal, and the phase adjustment unit may be configured to decrease or increase a phase of the incoming clock signal to steer the phase locked loop such that the delay in the data path in the system is substantially equal to the fixed delay value.

In another aspect of the present disclosure, in the apparatus, the fixed delay value may include an average delay in the data path in the system or a delay mid-point value between a minimum measured delay and a maximum measured delay measured in the data path for the predetermined measurement period.

In an aspect of the present disclosure, in the apparatus, the first frequency of the incoming clock signal and the second frequency of the outgoing clock signal may have a same frequency value.

In another aspect of the present disclosure, in the apparatus, when the incoming clock signal does not have any fixed relation with respect to the outgoing clock signal, the phase adjustment unit is further configured to steer the phase locked loop based at least on de-mapping information included in the incoming data signal. The de-mapping information may also include stuff indication information.

In another aspect of the present disclosure, when the incoming clock signal does not have any fixed frequency relation with respect to the outgoing clock signal, the phase adjustment unit is configured to steer the phase of the outgoing client signal based on mapping information (or additional mapping information) inserted in the server data signal, and the mapping information comprises stuff indication information.

In another aspect of the present disclosure, in the apparatus, the phase adjustment unit may be further configured to steer the phase locked loop based on a number of client data bits included in the incoming data signal and a latency determined in the data path in the system. The incoming data signal may include an optical transport network signal and the outgoing data signal may include an Ethernet client signal, such as one Gigabit Ethernet (1 GbE), ten Gigabit Ethernet (10 GbE), etc.

In another aspect of the present disclosure, in the apparatus, the phase adjustment unit may be further configured to steer the phase of the outgoing client signal based on a number of client data bits included in the outgoing server data signal and a latency determined in the data path in the system. Also, the incoming data signal may include an Ethernet client signal and the outgoing data signal may include an optical transport network signal.

In another aspect of the present disclosure, in the apparatus, the phase adjustment unit may further be configured to add additional de-mapping information to adjust an output frequency of the phase locked loop in such a way that the delay in the data path in the system is substantially equal to a fixed delay value. The phase adjustment unit may include a de-mapping synchronizer phase locked loop.

These and other features of the present disclosure will become more fully apparent from the following description and appended claims.

BRIEF DESCRIPTION OF THE DRAWINGS

A more detailed understanding may be obtained from the following description in conjunction with the following accompanying drawings.

DETAILED DESCRIPTION

The detailed description of illustrative examples will now be set forth below in connection with the various drawings. The description below is intended to be exemplary and in no way limit the scope of the claimed invention. It provides a detailed example of possible implementation(s), and is not intended to represent the only configuration in which the concepts described herein may be practiced. As such, the detailed description includes specific details for the purpose of providing a thorough understanding of various concepts, and it is noted that these concepts may be practiced without these specific details. In some instances, well known structures and components are shown in block diagram form in order to avoid obscuring such concepts. It is noted that like reference numerals are used in the drawings to denote like elements and features.

While for the purpose of simplicity the methodologies are described herein as a series of steps or acts, it is to be understood that the claimed subject matter is not limited by the order of steps or acts, as some steps or acts may occur in different orders and/or concurrently with other acts from that shown and described herein. Further, not all illustrated steps or acts may be required to implement various methodologies according to the present technology disclosed herein.

An increasing demand of bandwidth associated with video services and other network traffic such as LAN traffic drive the need for optical transport network (OTN) as a transport technology for point-to-point transmission application. OTN networks nowadays complement packet based transport such as Ethernet and multi-protocol label switching (MPLS), and existing synchronous optical networking and synchronous digital hierarchy (SONET/SDH) based networks. MPLS is a data transport technique for high performance telecommunication networks. SONET/SDH are standard protocols that transfer multiple digital bit streams synchronously over optical fiber using lasers or highly coherent light from light emitting diodes.

When data are transmitted from the Ethernet network to the OTN network, vice versa, a client signal such as Ethernet signal may be transported via an OTN server signal. The OTN signal includes an optical data unit (ODU) signal which is aggregated with other ODU signals to form various higher order signals that have the same frame format but different line rates. That is, client signals may be "mapped" to the OTN signals for transport purposes, and the OTN signals may be "de-mapped" to the client signals. By way of example, for client signals such as Ethernet client signals, e.g., 10GigE LAN signals, bit synchronous mapping (BMP) may be used, which uses a client clock for generation of the OTN signals. Alternatively, Ethernet client signals may be mapped into OTN signals using a combination of a generic frame procedure (GFP) and an asynchronous mapping procedure (AMP). Further, the OTN signals may be de-mapped into Ethernet client signals.

Further, Synchronous Ethernet (SyncE) may be transported over an OTN tunnel, via physical layer and/or via the logical layer, as described in U.S. patent application Ser. No. 14/516,995, titled "Electrical Transceiver for Synchronous Ethernet," the content of which is incorporated herein by reference in its entirety. SyncE is an ITU-T standard that facilitates the transfer of clock signals over an Ethernet physical layer. However, a transport of both SyncE and Time of Day (ToD) is not possible over the OTN because current OTN implementations have large variable delays for packet transport purposes. Further, an average delay of a total data path in a device or system configured to connect an Ethernet client network and an OTN network is not deterministic (or fixed). As such, the average delay may change for several hundreds of nanoseconds of time every time a link is reconnected and/or a system is rebooted.

The present technology described herein addresses one or more problems noted above in the existing technology. In an aspect of the present disclosure, a delay in a device or a system, e.g., the delay in a total data path, for transporting packets including Ethernet packets over an optical transport network is measured and/or controlled in such a way that the delay becomes deterministic, e.g., a fixed value. This control of the delay in the device or system results in a fixed latency of Ethernet signals that are transported over an OTN link, thereby greatly improving the performance of the system including the ToD synchronization.

Figure 1:
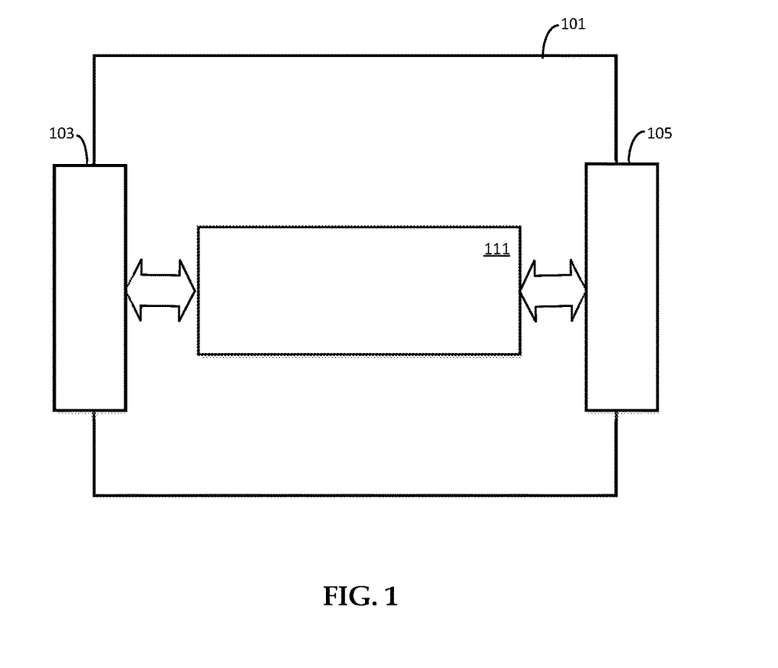
FIG. 1 is a block diagram conceptually illustrating at a high level the present technology in accordance with an aspect of the present disclosure.

FIG. 1 is a block diagram which conceptually illustrates an embodiment of the present technology for transporting Ethernet packets over an optical transport network, in accordance with an aspect of the present disclosure. An apparatus 101 as shown in FIG. 1 includes a delay control device 111 for controlling delay between a first interface 102 and a second interface 205. In the example, the apparatus 101 may be in the form of a routing device or system or the like that is capable of transporting Ethernet packets over OTN networks. The first interface 102 may be either an electrical interface or an optical interface. Similarly, the second interface 105 may be either an electrical interface or an optical interface. By way of example, in particular, the first interface 102 may be an interface or a port capable of supporting optical data, such as OTU2e, and the second interface 105 may be an interface or a port capable of supporting high speed client data or Ethernet client packets, such as 1 GbE, 10 GbE, STM64, etc. In an aspect of the present disclosure, the first interface 102 and the second interface 105 each may be configured to include an optical transceiver such as a smart small form-factor (SFP) module.

Further, the apparatus 101 is configured to control a delay in a total data path between the first interface 103 and the second interface 105. In the present disclosure, the phrase "a delay in a total data path" or "a delay in/over a data path" means a delay of a signal in or over a data path between two points in a device. Further, the phrase "a data path" as used herein may include one or more hardware or software components, including but not limited thereto, one or more registers, one or more logic components or blocks, one or more circuits, any combination thereof, or the like between the two interfaces, e.g., the first interface 103 and the second interface 105.

In operation, the delay control device 111 of the apparatus 101 may be configured to measure and/or determine variable delays in a whole data path between the two interfaces and use the delay measurements to bring back or adjust the delay in the total data path to a fixed value, which may be predetermined. This measurement and control of the delay results in a fixed latency of the Ethernet packets which are transported over an OTN link. That is, the delay control device 111 may be configured to control the delay over or in the total data path between the first interface 103 and the second interface 105 in such a way that the delay over or in the data path becomes substantially equal to the fixed value. As a result, such obtained fixed latency enables transportation of all Ethernet packets over the OTN link including the SyncE, network timing protocol (NTP) or IEEE1588 packets. SyncE is one method for synchronization clock distribution based on physical layer clock distribution. IEEE1588 is an industry standard for packet based timing distribution, as described in ITU-T G.8261 standard, the content of which is incorporated herein by reference in its entirety.

In an aspect of the present disclosure, because of the deterministic delay of an Ethernet signal over an OTN link, the performance of ToD synchronization may be controlled and maintained in such a way that the ToD synchronization stays within a desired range of a certain specification. For example, various aspects of the present technology lead to a very effective means to restrict or limit a packet delay variation (PDV) to about +/−50 nanoseconds (ns) and a fixed latency of about +/−50 ns. The phrase "a packet delay variation (PDV)" as used herein may mean a difference between end-to-end one way delay between selected packets in a flow. PDV occurs in a packet switching network in which non-deterministic store and forward principle is used.

Figure 2:
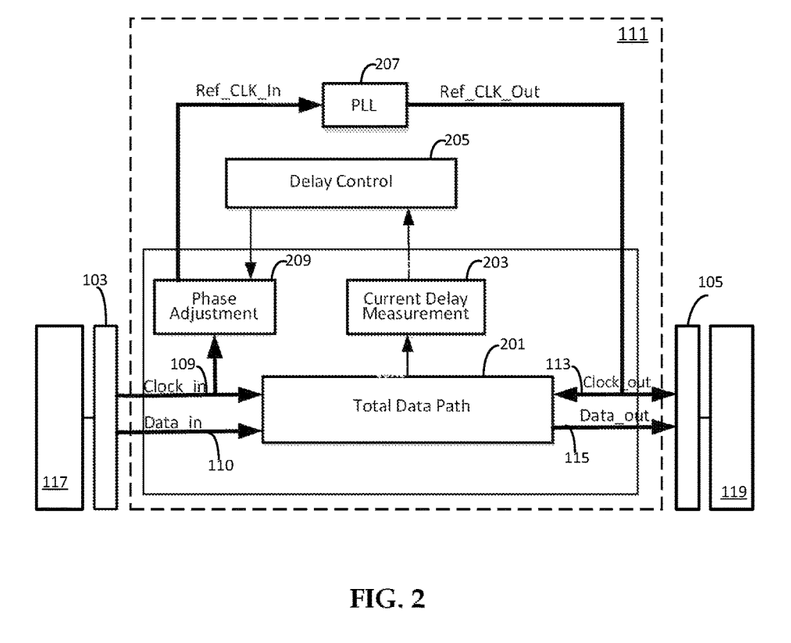
FIG. 2 is a block diagram conceptually illustrating an example embodiment in accordance with an aspect of the present disclosure.

FIG. 2 illustrates an embodiment of the present technology in an aspect of the present disclosure. By way of example, in FIG. 2, an apparatus or delay control 111 includes a total data path 201, a first interface 103, a second interface 105, a current delay measurement 203, a delay control 205, a phase adjustment 209, a delay control 205, and a phase locked loop 207. The delay control 111 is configured to control a delay in the total data path 201 between the first interface 103 and the second interface 105 in such a way that the delay in the total data path 201 is substantially equal to a fixed value or close to or remains within a predetermined range of values including the fixed value.

In the present disclosure, the apparatus 111 is configured to receive an incoming clock signal 109, e.g., clock_in, and an incoming data signal 110, e.g., data_in, via the first interface 103 which is coupled to a network 117. The apparatus 111 is further configured to produce or result in an outgoing clock signal 113, e.g., clock_out, and an outgoing data signal 115, e.g., data_out, to the second interface 105 which is coupled to a network 119. In the present disclosure, the phrase "a clock signal" may include a signal in the form of a square wave having a predetermined duty cycle and a constant, fixed frequency, which is used to synchronize different parts of a digital circuit.

The current delay measurement 203 is configured to measure one or more actual delays in the total data path 201 between the first interface 103 and the second interface 105. Further, the current delay measurement 203 is coupled to the delay control 205 which is configured to implement one or more functions or algorithms for controlling the delay in the total data path in the system between the first interface 103 and the second interface 105, in such a way that the latency through the system or the total data path 201 becomes deterministic and substantially around a same value, e.g., a predetermined value.

In the present disclosure, the words "delay" and "latency" are interchangeably used herein to mean an amount of time that elapses between two points. Further, in an aspect of the present disclosure, a delay between the first interface 103 and the second interface 105 may be measured by various techniques. By way of example, the delay may be measured by using timestamps between the two interfaces based on the transparent clock method, or by using an elastic store fill, e.g., monitoring fill levels of data in one or more buffers.

The phase adjustment 209 may be coupled to the delay control 205 and the phase locked loop (PLL) 207. The phase adjustment 209 is configured to provide a phase adjustment amount to the PLL 207, for example, to steer the PLL 207 based on the incoming clock signal 109 and a result from the delay control 105. In the example shown in FIG. 2, the phase adjustment 209 and/or the PLL 207 may be configured to increment or decrement a phase of the incoming clock frequency 109 to produce an adjusted clock signal, e.g., Ref_CLK_Out, the outgoing clock signal 113, clock_out, in such a way that the delay over the total data path 201 is substantially a fixed value, and the delay becomes a predetermined latency in the apparatus 111. In the present disclosure, the PLL 207 is configured to take care of delay shifts and frequency locking between the incoming clock 109, clock_in, and the outgoing clock 113, clock_out.

Figure 3:
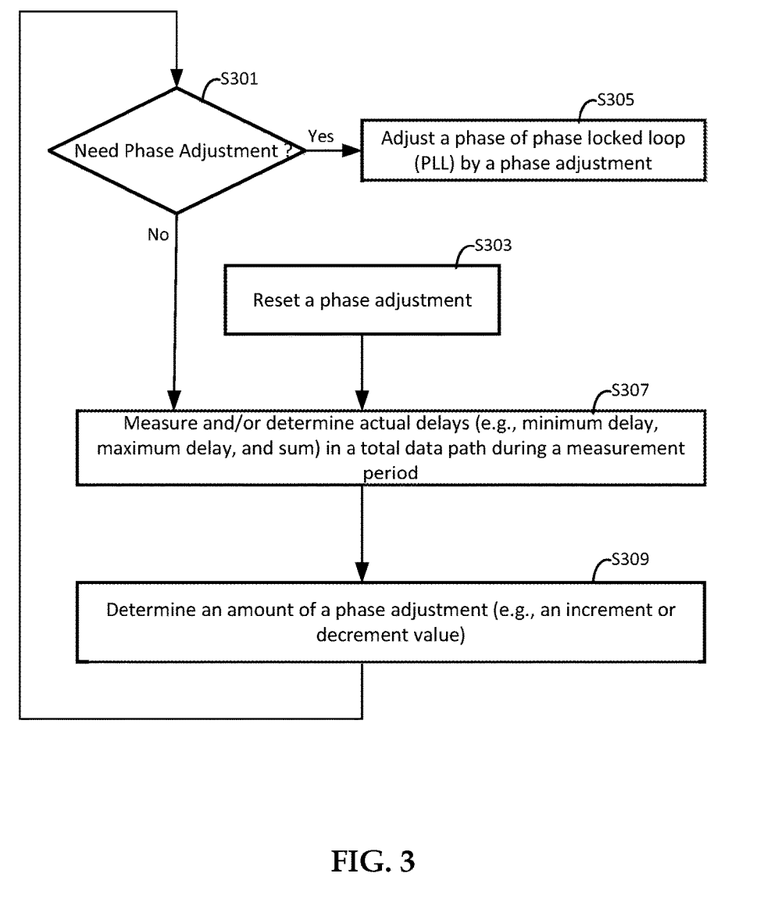
FIG. 3 is a flowchart conceptually illustrating an aspect of the present technology in accordance with an aspect of the present disclosure.

FIG. 3 is an example of a flowchart for a delay control function or algorithm in accordance with an aspect of the present disclosure. The flowchart 300 of FIG. 3 may be implemented by the delay control 205 or the like, which may be implemented in hardware or software or any combination thereof.

By way of example, the flowchart 300 illustrates an example of a delay control algorithm for physical signals, where an incoming clock frequency of a device or a system has a fixed relationship with an outgoing clock frequency. That is, the relationship between the incoming clock frequency and the outgoing clock frequency may be exactly the same frequency, e.g., between OTN and OTN. Alternatively, the relationship can be a fixed relation between two signals with different frequencies, e.g., between OTN and Ethernet, in which the OTN signal may be OTU2e and client signals may be either 1 GbE, 10 GbE, STM64, or etc. In accordance with an aspect of the present disclosure, the present technology using the delay control provides that a total delay or latency through the system will remain substantially constant when measured on various systems.

As shown in FIG. 3, at S303, a phase adjustment is reset for measurement and control of the delay. At S307, over a predetermined measurement period (or a measurement period), actual delays are measured in the total data path 201 between the first interface 103 and the second interface 105 within the apparatus 111. More specifically, one or more actual delays over the total data path may be measured (as one or more current measured delays) repetitively for the measurement period for an averaging process. As mentioned above, in an aspect of the present disclosure, a delay between the first interface 103 and the second interface 105 may be measured by using timestamps between the two interfaces 103 and 105 based on the transparent clock method, or by using an elastic store fill, e.g., monitoring fill levels of data in one or more buffers.

The measured actual delays may be used to determine a minimum measured delay during the measurement period, e.g., delay_meas_min, a maximum measured delay during the measurement period, e.g., delay_meas_max, and/or a summed delay of each measurement during the measurement period, e.g., delay_meas_sum. The minimum measured delay is a minimum delay value among a plurality of delay measurements during the measurement period. The maximum measured delay is a maximum delay value among the plurality of delay measurements during the measurement period. The summed delay is a summed value of the plurality of delay measurements during the measurement period.

In an aspect of the present disclosure, at an instant of time, after every received incoming frame or every received packet or after every N times including bytes, the current measured delay is used to update or determine both the minimum measured delay and the maximum measured delay. More specifically, if the current measured delay is greater than the maximum measured delay, then the maximum measured delay is updated with the current measured delay. On the other hand, if the current measured delay is smaller than the minimum measured delay, then the minimum measured delay is updated with the current measured delay. Further, the current measured delay may be summed to the summed delay, e.g., delay_meas_sum. This updating may be done iteratively over the measurement period.

In the present disclosure, the phrase "measurement period" as used herein means a time in between a reset of the maximum measured delay, the minimum measured delay, and the summed delay, and a start of the a new measurement period. At the start of each new measurement period, delay_meas_max, delay_meas_min, and delay_meas_sum may be reset to the then current measured delay.

At S309, a phase adjustment amount is determined, e.g., an amount by which to increase or decrease a phase of the phase locked loop 207 as shown in FIG. 2. For example, in the example shown in FIG. 2, the delay control 205 is configured to determine a phase adjustment amount by which to steer the phase locked loop 207 to have the delay over the total data path 201 become close to a predetermined value. In the example, the phase adjustment amount may be added or subtracted by the phase adjustment 209 by introducing an additional clock edge, e.g., REF_CLK_in (for a phase increment operation) or by removing a clock edge (for a phase decrement operation) such that the latency through the apparatus 111, that is, the latency over the total data path between the first interface 103 and the second interface 105, becomes or remains deterministic. The word "deterministic" as used herein means that the delay in the total data path becomes substantially equal to or substantially close to a fixed or constant value. Also, the phrase "steer[ing] phase locked loop" as used herein means adjusting a voltage or current driven oscillator to match or lock onto the phase and frequency of an input signal.

Figure 4A:
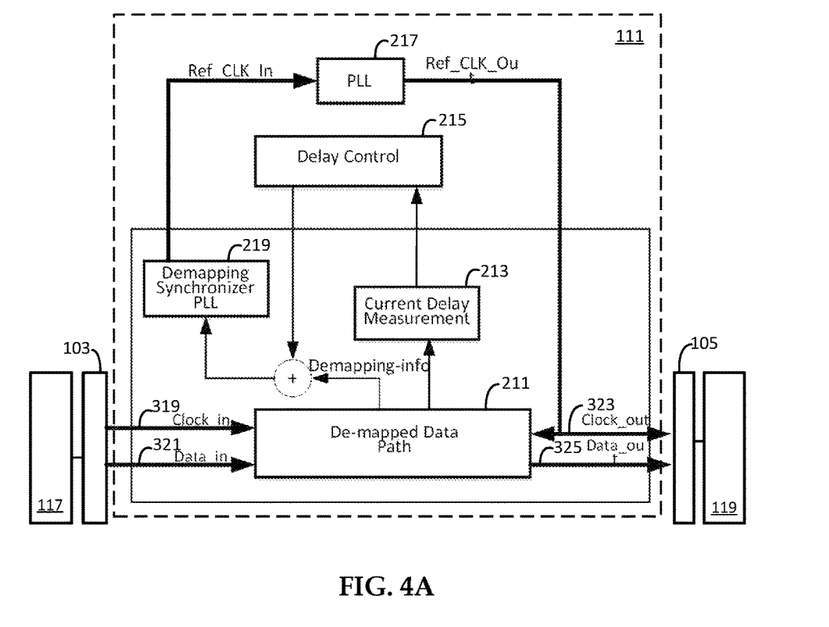
FIGS. 4A and 4B are block diagrams conceptually illustrating example embodiments in accordance with various aspects of the present disclosure.

FIG. 4A is a block diagram conceptually illustrating another embodiment of the present technology in accordance with an aspect of the present disclosure. As noted above, the first interface 103 and the second interface 105 are coupled to the apparatus 111. The apparatus 111 may include a de-mapped data path 211, a current delay measurement 213, a delay control 215, a de-mapping synchronizer phase locked loop (PLL) 219, a PLL 217. In the example shown in FIG. 4A, the apparatus 111 is configured to receive an a signal from a network side, e.g., an OTN signal including an incoming clock signal 319 and an incoming data signal 321, from the first interface 103, and produce a client side signal, e.g., an Ethernet signal including an outgoing clock signal 323 and an outgoing data signal 325 and output the client side signal to the second interface 105. As mentioned above, a clock frequency of the incoming clock signal 319 has no clear relation with a clock frequency of the outgoing clock signal 323.

However, in the example, the client side signal has a certain relationship with respect to the network side signal since the client side signal is mapped to the network side signal or vice versa. In other words, the client side signal and the OTN signal in which the client side signal is mapped have no frequency relationship other than the de-mapping information such as stuff indication information. This aspect is documented as frequency adaptation in ITU-T G.709 and G.798, in which the frequency adaptation is performed by processes such as AMP, BMP, GMP, GFP via mapping information such as stuff bits. Conceptually speaking at a high level, in one direction, the mapping process fills up an empty server data bits with "stuff bits" (e.g., mapping) and in the other direction, the client data bits are extracted or stuff bits are thrown away (e.g., de-mapping) and the frequency of the client side signal is recovered by a phase locked loop function that is steered based on certain information such as an elastic store fill.

Figure 4B:
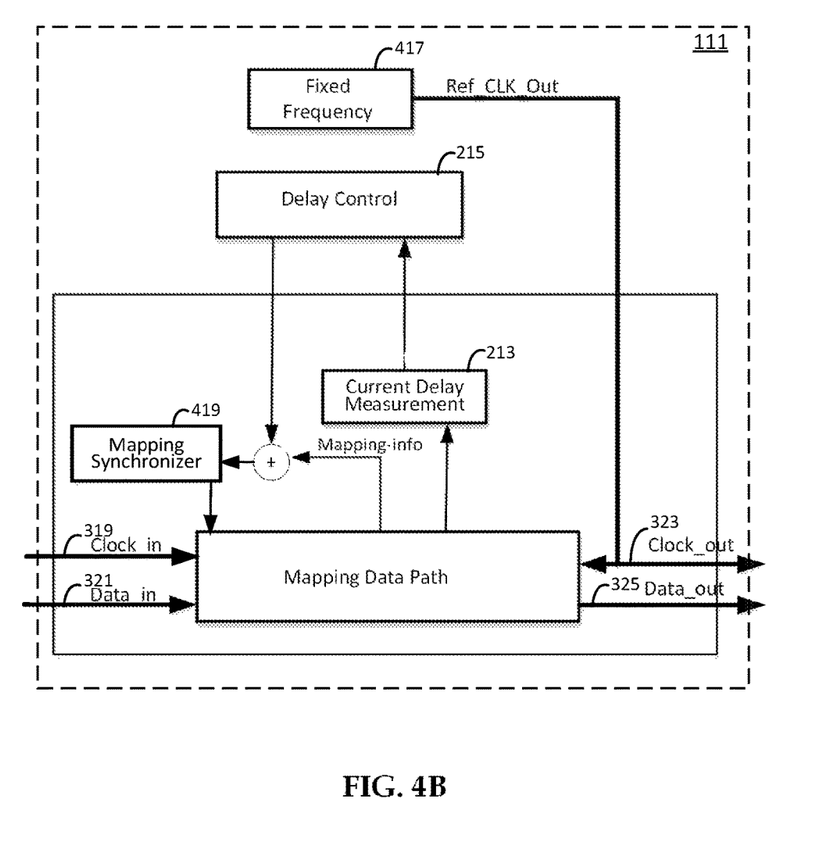
Figure 5:
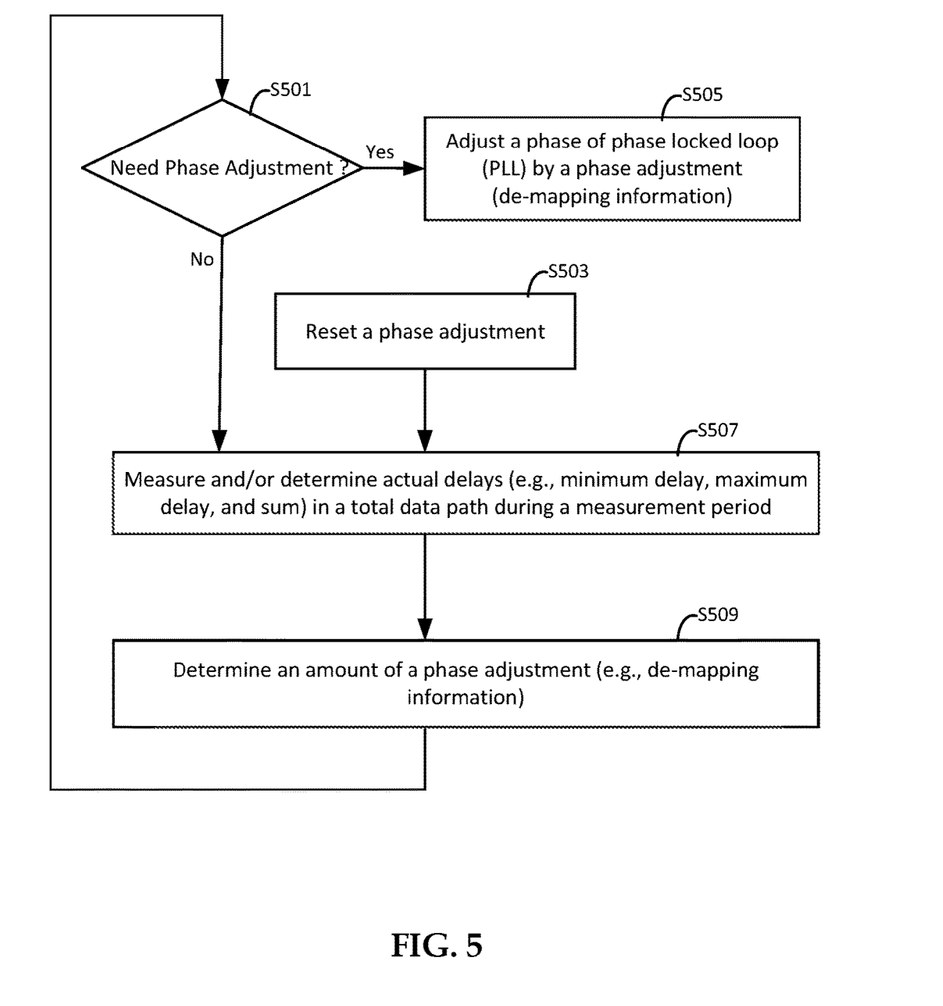
FIG. 5 is a flowchart conceptually illustrating an aspect of the present technology in accordance with an aspect of the present disclosure.
Figure 6:
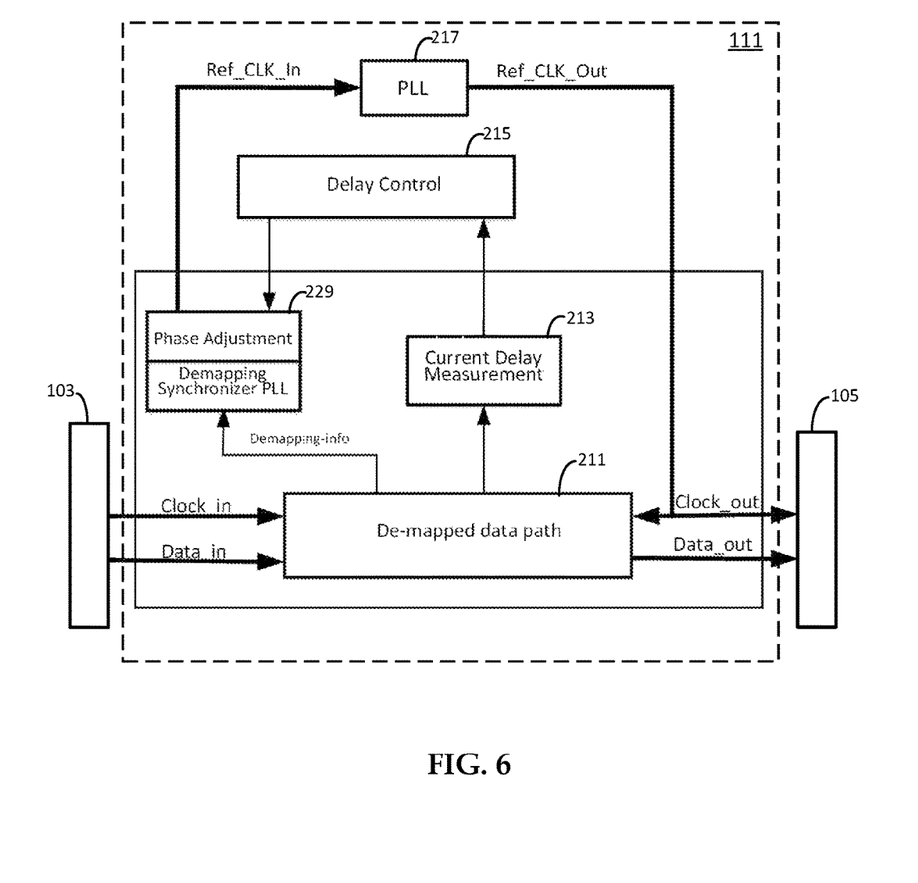
FIG. 6 a block diagram conceptually illustrating an example embodiment in accordance with an aspect of the present disclosure.

In an aspect of the present disclosure, the phase locked loop function is steered by both a number of client data bits and a latency through a device or system, which is kept constant to have both a correct output frequency and a fixed latency through the device or system, as shown in FIGS. 4-6. As such, fixed throughput delay through the device or system is established and maintained via additional de-mapping information.

Referring back to FIG. 4A, the current delay measurement 213 is configured to measure actual delays through the de-mapped data path 211. The delay control 215 is configured to receive one or more actual delay measurements made by the current delay measurement 213 and output information on the latency through the device. The de-mapping synchronizer phase locked loop (PLL) 219 uses at least the de-mapping information such as stuff bit information from the de-mapped data path 211 and the latency information from the delay control 215 to steer the phase locked loop 217.

In one implementation, the de-mapping information such as stuff bits may be directly used to steer the phase locked loop 217, via Ref_CLK_In, and the latency through the device is additionally read. If the delay is to be increased or decreased, additional de-mapping information is added for a very short time to adjust an output frequency of the phase locked loop 217, e.g., Ref_CLK_Out, in such a way that the latency through the device or system is brought back to a predetermined delay value, e.g., a value of a delay center.

In the present disclosure, the phrase "a delay center" as used refers to a provisioned delay center position that is used by a delay control algorithm which may be implemented by the delay control 215. The delay center may be an average delay or delay mid-point among actual delay measurements through a device or system between the two interfaces, e.g., the first interface 103 and the second interface 105. Further, the de-mapped data path 211 is defined as, for example, the Ethernet client data which is extracted from an OUT server layer by interpreting the de-mapping bits.

Further, the de-mapping bits related to the incoming clock 109 are normally used to determine the outgoing clock 323.

In the example, in an aspect of the present disclosure, the delay control algorithm 215 may use artificial de-mapping information to steer the de-mapping synchronizer PLL 219, hence controlling the delay through the de-mapped data path via controlling the outgoing clock 323.

In the present technology described herein, the word "artificial" is used to indicate that the de-mapping information is made up by the delay control algorithm to control the delay. Also, in an aspect of the present disclosure, the de-mapping information may steer the PLL which generates the Ethernet client signal, but to control the delay in the de-mapped data path, the delay control algorithm may have a means to change the delay. This is done by generating additional (or artificial) de-mapping information, which is not present in an OTN server signal but is generated by the delay control algorithm to change the delay in the data path. By way of example, an Ethernet signal which is extracted from an OTN server signal may have a nominal de-mapping (that is, bit stuff is nominal). In an aspect of the present disclosure, however, to make the delay bigger, the delay control algorithm may remove a bit stuff, and as such this means that the delay may increase with 1 bit of the OTN server signal. In other words, the control algorithm may add or skip a bit stuff opportunity to either increase or decrease the delay of a client signal. Further, as shown in FIG. 4A, a signal from the delay control 215 plus the de-mapping information are used to steer the de-mapping (or demapping) synchronizer PLL 219. In the example, the demapping information includes according or respective standards, and the signal from the delay control 215 includes an artificial (or made-up) part to change the delay in the de-mapped data path 211. As such, the demapping information path (e.g., the standard compliant path) and the artificial path (e.g., from the delay control algorithm towards the circle with the + sign in the middle) are fed to the demapping synchronizer PLL for steering.

In another aspect of the present disclosure, as shown in FIG. 4B, the artificial path from the delay control algorithm towards the circle with the + sign in the middle and the mapping information path (e.g., the standards compliant path) are input to the mapping synchronizer to determine how many client signal bits are sent per OTN frame. That is, a number of client signal bits per OTN frame is determined by stuff bits information, e.g., whether bit is used for data or used for stuff. In other words, when more bits are used for data, the delay is decreased, and when less bits are used for data, the delay is increased.

FIG. 5 is an example of another flowchart for illustrating steering the phase locked loop using the additional de-mapping information. In another embodiment of the present technology, the controlling of the delay in the device or the system may be done based at least on the de-mapping information in accordance with the flowchart as shown in FIG. 5. At S503, a phase adjustment is reset. At S507, for a predetermined period of time, e.g., a measurement period, one or more actual delays are measured throughout a de-mapped data path of a device or a system of interest. The phase "de-mapped data path" as used herein mean the data path of the Ethernet client signal de-mapped from the OTN server signal. Over the measurement period, actual delays may be measured in a de-mapped data path 211 between the first interface 103 and the second interface 105 within the system 111. More specifically, one or more actual delays over the de-mapped data path 211 may be measured repetitively for the measurement period. The measured actual delays are then used to determine a minimum measured delay during the measurement period, e.g., delay_meas_min, a maximum measured delay during the measurement period, e.g., delay_meas_max, and/or a summed delay of each measurement during the measurement period, e.g., delay_meas_sum.

By way of example, at an instant of time, after every received incoming frame or every received packet or after every n times including bytes, the current measured delay is used to update or determine both the minimum measured delay and the maximum measured delay. Further, if the current measured delay is greater than the maximum measured delay, then the maximum measured delay is updated with the current measured delay. On the other hand, if the current measured delay is smaller than the minimum measured delay, then the minimum measured delay is updated with the current measured delay. Also, the current measured delay may be summed to the summed delay, e.g., delay_meas_sum. This updating may be done iteratively over the measurement period.

At S509, a phase adjustment amount is determined, e.g., an amount to increase or decrease a phase of the phase locked loop. For example, the delay control 205 may be configured to determine a phase adjustment amount by which to steer the phase locked loop 207 to have the delay over the de-mapped data path 211 close a predetermined value of a latency.

From the de-mapped data path 211, de-mapping information such as information on stuff bits may be extracted and made available for use by the de-mapping synchronizer phase locked loop (PLL) 219.

Further, in the example, based on the de-mapping information and the latency determined by the delay control 215, the de-mapping synchronizer PLL 219 may increase or decrease the delay through the device or the system 111, for example, by adding or subtracting for a very short time additional de-map information, e.g., stuff bits, to adjust the output frequency of the phase locked loop 217 in such a way that the latency through the device or system is brought back to a predetermined value of the latency in the device or the system 111. In this way, the delay of the de-mapped signals may be controlled and the latency through the device or system may be controlled and kept constant.

Further, in the example shown in FIG. 3, the de-mapping synchronizer PLL 219 and the phase locked loop 217 are configured to work together to control and maintain the latency of the device or the system 111 to be constant. However, in another implementation, the de-mapping synchronizer PLL 219 and the phase locked loop 217 may be combined into one phase locked loop to control the delay in the de-mapped data path 211 in the device or the system 111.

FIG. 6 is a block diagram illustrating another example of an embodiment of the present disclosure. In the example shown in FIG. 6, the phase locked loop 217 may be steered by the phase adjustment (e.g., a phase increment or a phase decrement) along with the de-mapping synchronizer PLL 229. The de-mapping information such as stuff bits information may be extracted from the de-mapped data path 211 and fed to the de-mapping synchronizer PLL. Also, the phase adjustment amount may be determined by the delay control 215 based on the outputs of the current delay measurement 213. The phase adjustment amount in combination with the de-mapping information may also be used to steer the frequency of the phase locked loop 217 by adding or removing a clock edge of the reference clock signal that is being input to the phase locked loop 217, e.g., Ref_CLK_In. As a result, the latency through the device or system may be controlled and kept constant.

As such, by means of various embodiments of the present disclosure, the device or system embodying one or more aspects of the present technology may provide a fixed latency for all Ethernet packets that are transported over an OTN link including NTP or IEEE1588 packets, thereby enabling the device or system to have a deterministic delay of an Ethernet signal over the optical transport network. As such, the present technology provides numerous benefits. For example, among many other benefits, the present technology get rid of any need for distributing the ToD via another path due to variable delays in both directions (from OTN to client side or vice versa). Further, IEEE1588 may be implemented without breaking the SyncE feature. In other words, there is no need for converting the Ethernet line-code to packets, searching for IEEE1588 packets, determining expected delay through the system, adding the measured system delay in the IEEE1588 packet, and converting the packets back to the Ethernet line-code. As a result, the present technology as disclosed herein provides numerous benefits and technical enhancements including the improved performance of the ToD synchronization by maintaining the performance of the ToD synchronization within a desired specification via Ethernet packets over OTN transport.

Various aspects of the present disclosure may also be implemented by one or more processing systems. For example, the present technology, or its various components as shown in FIGS. 1-6 may be implemented with a bus architecture, which may include a bus and any suitable number of interconnecting buses and bridges, as shown in FIG. 7.

Figure 7:
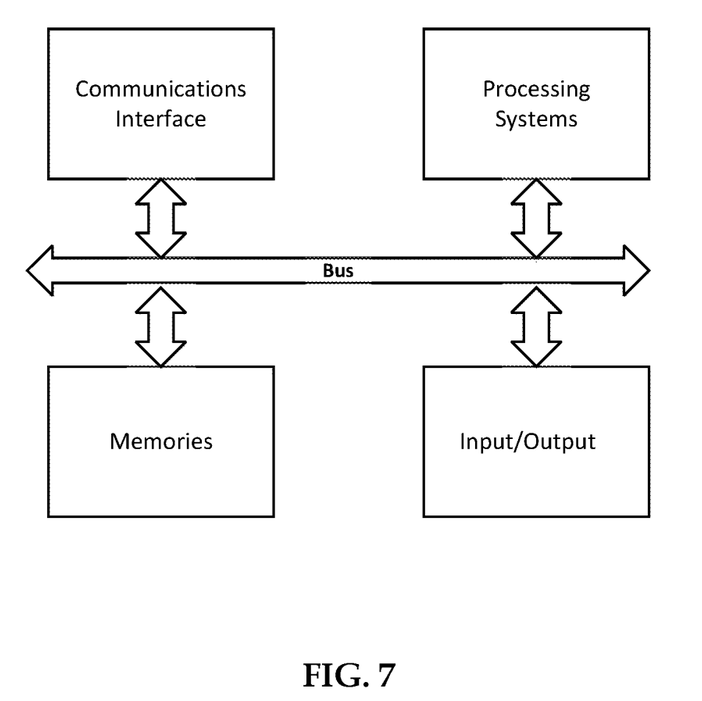
FIG. 7 is a block diagram conceptually illustrating an example embodiment in accordance with an aspect of the present disclosure.

FIG. 7 shows a diagram illustrating an example of a processing system. As shown in FIG. 7, the bus may link together various circuits, including one or more processing systems (or processors), one or more memories, one or more communication interfaces, and/or one or more input/output devices. The one or more processing systems may be responsible for managing the bus and general processing, including the execution of software stored on a non-transitory computer-readable medium. Further, the one or more processing systems may include one or more processors, such as microprocessors that interpret and execute instructions. In other implementations, the one or more processing systems may be implemented as or include one or more application specific integrated circuits, field programmable logic arrays, or the like. The software, when executed by the one or more processing systems, may cause the one or more processing systems to perform the various functions described herein for any particular apparatus. The non-transitory computer-readable medium may also be used for storing data that is manipulated by the one or more processing systems when executing software. The one or more memories may include various types of memories, including a random access memory and/or a read only memory, and/or other types of magnetic or optical recording medium and its corresponding device for storing information and/or instructions and/or retrieval thereof. The one or more communication interfaces may also include any transceiver-like mechanism that enables communication with other devices and/or systems, including optical transceivers (e.g., TOSA and/or ROSA). The one or more input/output devices may include devices that permit inputting information and/or outputting information to an operator.

Here, the term "processing system" or "processor component" as used herein means any hardware, software, or any combinations thereof, which are capable of performing or executing various functions or algorithms described herein in the present disclosure. The processing system (or processor component) may include, but not limited thereto, one or more processing systems including processors, central processing unit (CPU), microcontrollers, controllers, integrated circuits, application specific integrated circuits (ASIC), hardware logics, gates, field programmable gate arrays (FPGA), programmable logic circuits, or the like. The term "software" may include, but not limited thereto, any machine readable and/or executable codes, instructions, or the like, whether in high level programming languages or machine readable languages, any variants thereof, or the like, configured to perform various functions in accordance with aspects of the present disclosure.

The term "small form-factor (SFP)" or "SFP module" as used herein refers to a specification for optical modular transceivers, which are designed for use with small form factor connectors and may be hot-swappable devices. The SFP modules may be multi-source agreement (MSA) compliant and allow for optical and/or electrical interfaces, converting the electrical signals to optical signals, vice versa, and may be available for use with a variety of media, such as copper media, optical fiber (e.g., multimode optical fiber, or single mode optical fiber), etc. Generally, an existing SFP module may be used to plug into a port of a network switch and connect to a fiber channel and gigabit Ethernet (GbE) optical fiber cables at the another location thereon. Thus, the existing SFP module may enable the same electrical port on the network switch to connect to different types of optical fibers, including multi-mode or single-mode fibers.

Even though particular combinations of features are disclosed in the specification and/or recited in the claims, these combinations are not intended to limit the disclosure of the present technology. Further, the methods or methodologies for the present technology disclosed herein, including algorithms or functions represented by flowcharts as shown in FIGS. 3 and 5 but not limited thereto, may be implemented in software, hardware, any combinations of software and hardware, a computer program or firmware incorporated in a computer readable medium for execution by a controller, a processor, a computer, or a processing system that includes one or more processors. Examples of processors include microcontrollers, microprocessors, digital signal processors (DSPs), discrete hardware circuits, gated logic, state machines, programmable logic devices (PLDs), field programmable gate arrays (FPGAs), and other suitable hardware configured to perform various functions described herein. The term "software" as used herein is to be construed broadly to mean any instructions, instruction sets, programs, subprograms, code, program code, software modules, applications, software packages, routines, objects, executables, threads of execution, procedures, functions, etc. including firmware, microcode, middleware, software, hardware description language, or the like.

Also, the term "software" as used herein includes various types of machine instructions including instructions, code, programs, subprograms, software modules, applications, software packages, routines, subroutines, executables, procedures, functions, etc. The software may also refer to general software, firmware, middleware, microcode, hardware description language, or etc. As noted above, the software may be stored on a computer-readable medium.

Examples of a computer-readable medium may include a non-transitory computer-readable medium, such as, by way of example, an optical disk, a magnetic storage device, a digital versatile disk, a flash memory, random access memory (RAM), read only memory (ROM), a register, programmable ROM (PROM), erasable PROM (EPROM), electrically erasable PROM (EEPROM), a removable disk, a flash memory device, and any other suitable medium for storing software that may be accessed and read by a processor or a processing system. It is also appreciated that one skilled in the art will recognize how best to implement the described functionality relating to adding new system functionalities to an existing network element, depending upon a particular application within design constraints.

The term "unit" or "component" as used herein means software, hardware, or any combinations thereof. A unit may be implemented as a software component, a hardware component, or any combinations thereof, including a field programmable gate array (FPGA), logic, logic arrays, application specific integrated circuit (ASIC), digital signal processor (DSP), microcontroller, microprocessor, etc. or any combinations thereof. The unit thus may include software components, task components, processes, procedures, functions, program code, firmware, micro-codes, circuits, data structures, tables, arrays, and variables.

While for the purpose of simplicity the methodologies are described herein as a series of steps or acts, it is to be understood that the claimed subject matter is not limited by the order of steps or acts, as some steps or acts may occur in different orders and/or concurrently with other acts from that shown and described herein. Further, not all illustrated steps or acts may be required to implement various methodologies according to the present technology disclosed herein. Furthermore, the methodologies disclosed herein and throughout this specification are capable of being stored on an article of manufacture to facilitate transporting and transferring such methodologies to one or more processing systems. The term "article of manufacture" is intended to encompass a computer program accessible from any computer-readable device, carrier, or medium. A singular form may include a plural form if there is no clearly opposite meaning in the context. Also, as used herein, the article "a" is intended to include one or more items. Further, no element, act, step, or instruction used in the present disclosure should be construed as critical or essential to the present disclosure unless explicitly described as such in the present disclosure. As used herein, except explicitly noted otherwise, the term "comprise" and variations of the term, such as "comprising," "comprises," and "comprised" are not intended to exclude other additives, components, integers or steps. The terms "first," "second," and so forth used herein may be used to describe various components, but the components are not limited by the above terms. The above terms are used only to discriminate one component from other components, without departing from the scope of the present disclosure. Also, the term "and/or" as used herein includes a combination of a plurality of associated items or any item of the plurality of associated items. Further, it is noted that when it is described that an element is "coupled" or "connected" to another element, the element may be directly coupled or directly connected to the other element, or the element may be coupled or connected to the other element through a third element. A singular form may include a plural form if there is no clearly opposite meaning in the context. In the present disclosure, the term "include" or "have" as used herein indicates that a feature, an operation, a component, a step, a number, a part or any combination thereof described herein is present. Further, the term "include" or "have" does not exclude a possibility of presence or addition of one or more other features, operations, components, steps, numbers, parts or combinations. Furthermore, the article "a" as used herein is intended to include one or more items. Moreover, no element, act, step, or instructions used in the present disclosure should be construed as critical or essential to the present disclosure unless explicitly described as such in the present disclosure.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. A method of controlling a delay over a fixed deterministic data path in a device for transporting packets over an optical network, the method comprising adjusting a phase of an outgoing clock signal based on a phase adjustment amount that is determined using one or more measured delays over the data path, such that the data path in the device is substantially equal to a fixed delay value.

2. The method according to claim 1, wherein adjusting the phase of the outgoing clock signal comprises adjusting a phase locked loop by either decreasing or increasing a phase of an incoming signal.

3. The method according to claim 1, wherein the fixed delay value comprises an average delay over the data path in the device, or a delay mid-point value between a minimum measured delay and a maximum measured delay over the data path in the device for a predetermined measurement period.

4. The method according to claim 1, wherein adjusting the phase of the outgoing clock signal comprises steering the phase of the outgoing clock signal based on stuff indication information.

5. The method according to claim 1, wherein the device is configured to receive an incoming data signal and output an outgoing data signal.

6. The method according to claim 5, wherein the incoming data signal comprises an Ethernet client signal or an optical transport network signal.

7. The method according to claim 6, wherein the outgoing data signal comprises an Ethernet client signal or an optical transport network signal.

8. The method according to claim 1, wherein adjusting the phase of the outgoing clock signal comprises steering a phase of the phase locked loop based on: (i) a number of client data bits in an incoming data signal and a latency in the data path in the device, or (ii) a number of data bits to be inserted in an outgoing data signal.

9. The method according to claim 1, wherein adjusting the phase of the outgoing clock signal comprises adding additional de-mapping information to adjust an output frequency of a phase of the phase locked loop in such a way that the delay in the data path in the device is substantially equal to the fixed delay value.

10. The method according to claim 1, further comprising steering a phase of a client signal based on an additional number of mapping data bits in a server data signal to control a latency of a client data path in the device.

11. The method according to claim 1, wherein adjusting the phase of the outgoing clock signal comprises adding additional mapping information to adjust an output frequency of a phase locked loop in such a way that the delay in the data path in the device is substantially equal to the fixed delay value.

12. An apparatus for controlling a delay over a fixed deterministic data path in a device for transporting packets over an optical network, the apparatus comprising: means for adjusting a phase of an outgoing clock signal based on a phase adjustment amount that is determined using one or more measured delays over the data path, such that the data path in the device is substantially equal to a fixed delay value.

13. The apparatus according to claim 12, wherein the means for adjusting the phase of the outgoing clock signal comprises means for adjusting a phase locked loop by either decreasing or increasing a phase of an incoming signal.

14. The apparatus according to claim 12, wherein the fixed delay value comprises an average delay over the data path in the device, or a delay mid-point value between a minimum measured delay and a maximum measured delay over the data path in the device for a predetermined measurement period.

15. The apparatus according to claim 12, wherein the means for adjusting the phase of the outgoing clock signal comprises means for steering the phase of the outgoing clock signal based on stuff indication information.

16. The apparatus according to claim 12, wherein the device is configured to receive an incoming data signal and output an outgoing data signal, the incoming data signal comprising an Ethernet client signal or an optical transport network signal.

17. The apparatus according to claim 12, wherein the means for adjusting the phase of the outgoing clock signal comprises the means for steering a phase of the phase locked loop based on: (i) a number of client data bits in an incoming data signal and a latency in the data path in the device, or (ii) a number of data bits to be inserted in an outgoing data signal.

18. The apparatus according to claim 12, wherein the means for adjusting the phase of the outgoing clock signal comprises means for adding additional de-mapping information to adjust an output frequency of a phase of the phase locked loop in such a way that the delay in the data path in the device is substantially equal to the fixed delay value.

19. The apparatus according to claim 12, further comprising means for steering a phase of a client signal based on an additional number of mapping data bits in a server data signal to control a latency of a client data path in the device.

\* \* \* \* \*